US 9,097,912 B2

(12) United States Patent
Shinohara

(10) Patent No.: US 9,097,912 B2
(45) Date of Patent: Aug. 4, 2015

(54) LENS BARREL AND OPTICAL APPLIANCE

(75) Inventor: Mitsuru Shinohara, Yokohama (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 42 days.

(21) Appl. No.: 13/332,767

(22) Filed: Dec. 21, 2011

(65) Prior Publication Data

US 2012/0154928 A1    Jun. 21, 2012

(30) Foreign Application Priority Data

Dec. 21, 2010   (JP) ................................ 2010-284977
Nov. 24, 2011   (KR) ........................ 10-2011-0123762

(51) Int. Cl.
*G02B 15/14*   (2006.01)
*G02B 27/64*   (2006.01)
*G02B 7/04*    (2006.01)

(52) U.S. Cl.
CPC ............... *G02B 27/646* (2013.01); *G02B 7/04* (2013.01); *G02B 15/14* (2013.01)

(58) Field of Classification Search
CPC ......... G02B 15/14; G02B 27/646; G02B 7/04
USPC .......... 359/694, 693, 699–706, 813, 819–830
See application file for complete search history.

(56) References Cited

U.S. PATENT DOCUMENTS

| | | | |
|---|---|---|---|
| 5,530,596 A | 6/1996 | Fukino et al. | |
| 5,592,335 A | 1/1997 | Omi et al. | |
| 5,666,563 A | 9/1997 | Iijima et al. | |
| 5,680,251 A | 10/1997 | Kato et al. | |
| 5,826,114 A * | 10/1998 | Miyamoto et al. | 396/55 |
| 5,907,439 A * | 5/1999 | Matsui | 359/700 |
| 5,930,042 A * | 7/1999 | Miyamoto et al. | 359/557 |
| 6,049,432 A * | 4/2000 | Machida et al. | 359/700 |
| 6,094,534 A * | 7/2000 | Omiya | 396/72 |
| 6,104,551 A | 8/2000 | Matsui | |
| 6,295,412 B1 | 9/2001 | Katano et al. | |
| 6,381,076 B1 | 4/2002 | Kashiwaba | |
| 2005/0254140 A1 * | 11/2005 | Sakamoto | 359/695 |

FOREIGN PATENT DOCUMENTS

DE    19921282    11/1992
DE    19900146    7/1999

(Continued)

OTHER PUBLICATIONS

European Search Report Issued on Aug. 2, 2012 in EP Patent Application No. 11194958.2.
Partial European Search Report Issued on Mar. 30, 2012 in EP Patent Application No. 11194958.2.

(Continued)

*Primary Examiner* — Thomas K Pham
*Assistant Examiner* — Vipin Patel
(74) *Attorney, Agent, or Firm* — Staas & Halsey LLP

(57) ABSTRACT

A lens barrel includes a first retaining member to retain a first driving unit, a second retaining member to retain a second driving unit, a fixing cylinder in which the first retaining member and the second retaining member are disposed adjacent to each other in an optical axis direction, and a cam cylinder disposed about an outer circumference of the fixing cylinder rotatable in a circumferential direction, and the first and the second retaining members are moveable in the fixing cylinder following a same trajectory according to a rotation of the cam cylinder.

15 Claims, 13 Drawing Sheets

(56) References Cited

FOREIGN PATENT DOCUMENTS

| | | |
|---|---|---|
| EP | 1647850 | 4/2006 |
| JP | 2000304996 | 11/2000 |

OTHER PUBLICATIONS

Chinese Office Action dated Feb. 12, 2015 from Chinese Patent Application No. 201110451014.1, 20 pages.

\* cited by examiner

LENS BARREL AND OPTICAL APPLIANCE

CROSS-REFERENCE TO RELATED APPLICATIONS

This application claims priority from and the benefit under 35 U.S.C. §119 from Japanese Patent Application No. 2010-284977, filed on Dec. 21, 2010, in the Japanese Patent Office, and Korean Patent Application No. 2011-0123762, filed on Nov. 24, 2011, in the Korean Intellectual Property Office, the disclosures of which are incorporated herein by reference in their entirety.

BACKGROUND

1. Field

The present general inventive concept generally relates to a lens barrel and an optical appliance.

2. Description of the Background

An inner focus zoom lens among a plurality of lenses arranged in a lens barrel performs zooming and focusing by moving a zoom lens (variator) and a focus lens in an optical axis direction.

Such an inner focus zoom lens is widely being used in an optical appliance, such as a photographing apparatus including a digital video camera and a digital still camera, or an image projecting apparatus including a projector, since the entire length of the inner focus zoom lens is not subject to change by focusing, and the inner focus zoom lens can contribute to miniaturization and lightness of the lens barrel and the optical appliance.

Also, the zoom lens has a hand shaking compensating (image shaking compensating) operation to compensate for image shaking caused by hand shaking by moving some lenses in a perpendicular direction with respect to an optical axis.

However, the lens barrel, which has the zoom operation or the hand shaking compensating operation as described above, includes a lens retaining member, which retains a lens, a fixing cylinder, which receives the lens retaining member therein and has a guide slit engaged with a guide pin protruding from an outer circumference of the lens retaining member, and a cam cylinder, which is rotatable around an outer circumference of the fixing cylinder in a circumferential direction while receiving the fixing cylinder therein, and which has a cam slit engaged with the guide pin protruding from the guide slit. In the lens barrel, the guide pin is relatively moved in the guide slit and the cam slit by rotating the cam cylinder so that the lens retaining member is moved in the fixing cylinder in the optical axis direction.

The lens barrel mounts thereon a driving unit, such as a focus actuator unit to displace the lens in an optical axis direction while performing focusing or an anti-vibration actuator unit to displace the lens in a perpendicular direction to the optical axis while compensating for hand shaking.

As such, it is important to compactly arrange the parts, such as the lens retaining member, to retain the lenses or the driving unit to drive the lenses and arrange the parts in the fixing cylinder to make the lens barrel smaller and lighter.

In the case that the parts are integrated into a single unit, the lens barrel can achieve miniaturization or lightness due to the simplified structure and the reduced number of parts. However, in the case that the driving units, such as the focus actuator unit and the anti-vibration actuator unit are arranged adjacent to each other in the fixing cylinder, there is a problem that the driving units harmfully affect each other due to their respective vibrations while detecting each other's locations.

SUMMARY

The present general inventive concept provides a lens barrel having a decreased size and weight, and an optical appliance having the lens barrel.

Exemplary embodiments of the present general inventive concept will be set forth in part in the description which follows and, in part, will be obvious from the description, or may be learned by practice of the general inventive concept.

The foregoing and/or other features and utilities of the present general inventive concept may be achieved by providing a lens barrel including: a first retaining member to retain a first driving unit; a second retaining member to retain a second driving unit; a fixing cylinder in which the first retaining member and the second retaining member are disposed adjacent to each other in an optical axis direction; and a cam cylinder disposed about an outer circumference of the fixing cylinder, the cam cylinder being rotatable about the fixing cylinder in a circumferential direction, and the first and the second retaining members are movable along a same trajectory in the fixing cylinder according to a rotation of the cam cylinder, wherein the lens barrel is configured to inhibit transmission of vibrations between the first and the second driving units while detecting each other's locations.

The foregoing and/or other features and utilities of the present general inventive concept may be achieved by providing a lens barrel including: a retaining unit in which a first retaining member to retain a first driving unit and a second retaining member to retain a second driving unit, the first retaining member and the second retaining member being adjacent in an optical axis direction and integrated with each other; a fixing cylinder in which the retaining unit is disposed and comprises a guide slit engaged with a guide pin protruding from an outer circumference of one of the first retaining member and the second retaining member, the guide pin being moveable in the guide slit, and the first retaining member and the second retaining member of the retaining unit being movable along a same trajectory in the fixing cylinder; and a cam cylinder disposed about an outer circumference of the fixing cylinder, the cam cylinder being rotatable about the fixing cylinder in a circumferential direction, the cam cylinder comprising a cam slit engaged with the guide pin protruding from the guide slit, the guide pin being moveable in the cam slit, wherein the first retaining member and the second retaining member of the retaining unit are moveable in the fixing cylinder by the guide pin engaged with the guide slit and the cam slit according to a rotation of the cam cylinder.

The foregoing and/or other features and utilities of the present general inventive concept may be achieved by providing a lens barrel including: a first retaining member to retain a first driving unit; a second retaining member to retain a second driving unit; a fixing cylinder in which the first retaining member and the second retaining member are disposed adjacent to each other in an optical axis direction, and the fixing cylinder comprising guide slits engaged with a first guide pin and a second guide pin protruding from outer circumferences of the first retaining member and the second retaining member, the first guide pin and the second guide pin being moveable in the guide slits, the first retaining member and the second retaining member being moveable along a same trajectory in the fixing cylinder; and a cam cylinder disposed about an outer circumference of the fixing cylinder, the cam cylinder being rotatable about the fixing cylinder in a circumferential direction, the cam cylinder comprising a first cam slit engaged with the first guide pin protruding from the guide slit and a second cam slit engaged with the second guide pin protruding from the guide slit, the first guide pin being moveable in the first cam slit, the second guide pin being moveable in the second cam slit, and the first and the second cam slits having a same trajectory, wherein the first retaining member and the second retaining member are moveable in the fixing cylinder by the first guide pin and the second guide pin according to a rotation of the cam cylinder.

The foregoing and/or other features and utilities of the present general inventive concept may be achieved by providing a lens barrel including: a first retaining member to retain a first driving unit; a second retaining member to retain a second driving unit; a fixing cylinder in which the first retaining member and the second retaining member are disposed adjacent to each other in an optical axis direction, and the fixing cylinder comprising guide slits engaged with a first guide pin and a second guide pin protruding from outer circumferences of the first retaining member and the second retaining member, the first guide pin and the second guide pin being moveable in the guide slits, the first retaining member and the second retaining member being moveable along a same trajectory in the fixing cylinder; and a cam cylinder disposed about an outer circumference of the fixing cylinder, the cam cylinder being rotatable about the fixing cylinder in a circumferential direction, the cam cylinder comprising a cam slit engaged with the first guide pin and the second guide pin protruding from the guide slits, the first guide pin in contact with an edge of one side of the cam slit, the second guide pin in contact with an edge of the other side of the cam slit, and the first guide pin and the second guide pin being moveable in the cam slit, wherein the first retaining member and the second retaining member are moveable in the fixing cylinder by the first and the second guide pins according to a rotation of the cam slit.

As described above, the lens barrel and the optical appliance having a decreased size and weight and prevent vibrations occurring in the driving units from harmfully affecting each other when detecting locations of the driving units.

BRIEF DESCRIPTION OF THE DRAWINGS

These and/or other exemplary embodiments of the present general inventive concept will become apparent and more readily appreciated from the following description of the embodiments, taken in conjunction with the accompanying drawings of which.

DETAILED DESCRIPTION OF THE EXEMPLARY EMBODIMENTS

Figure 1:
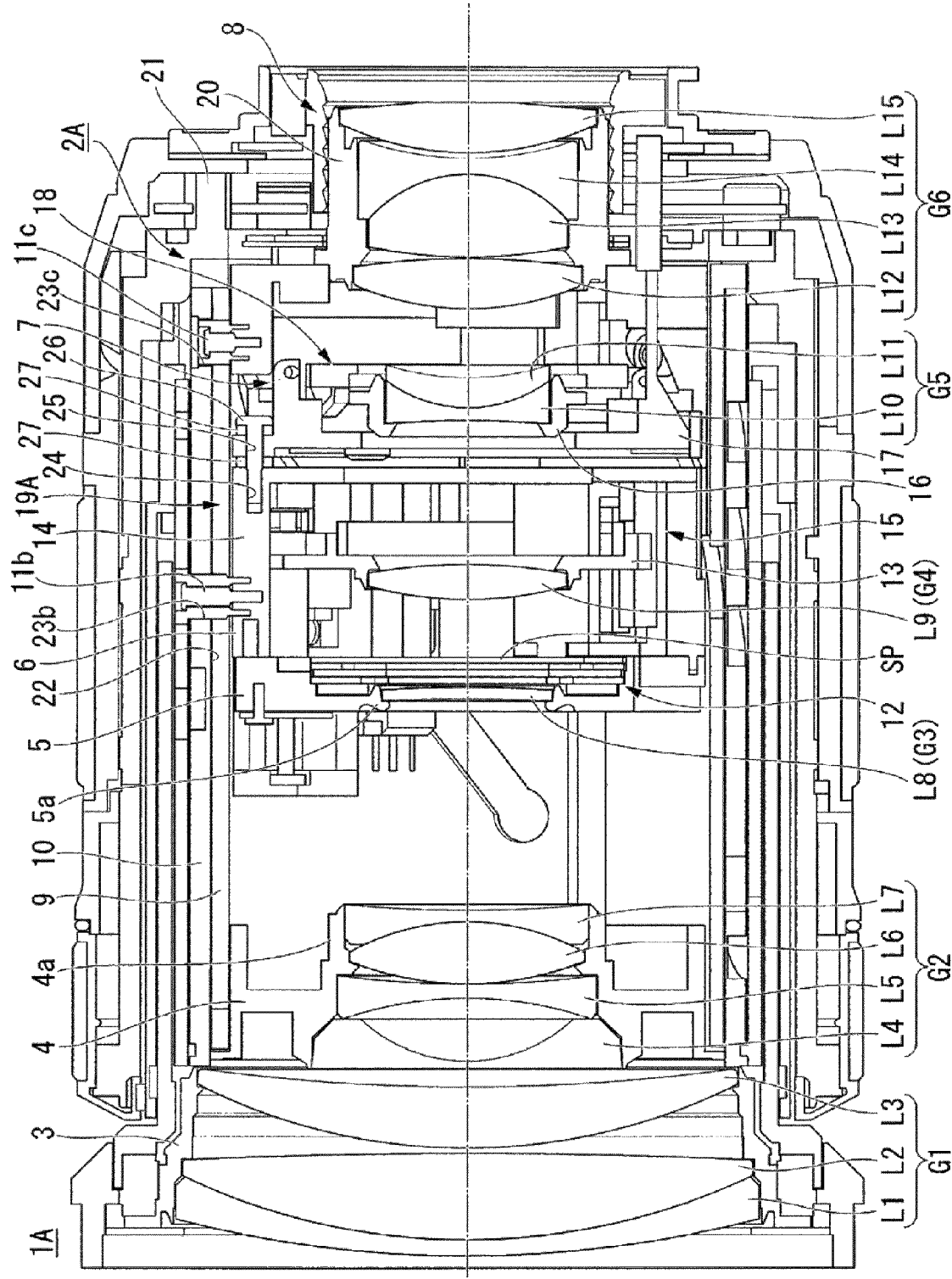
FIG. 1 is a cross sectional view illustrating an inner structure of an interchangeable lens according to an exemplary embodiment.

Reference will now be made in detail to exemplary embodiments of the present general inventive concept, examples of which are illustrated in the accompanying drawings, wherein like reference numerals refer to like elements throughout. Exemplary embodiments are described below in order to explain the present general inventive concept by referring to the figures.

Hereinafter, a lens barrel and an optical appliance to which the present general inventive concept is applied will be explained with reference to the accompanying drawings.

Figure 2:
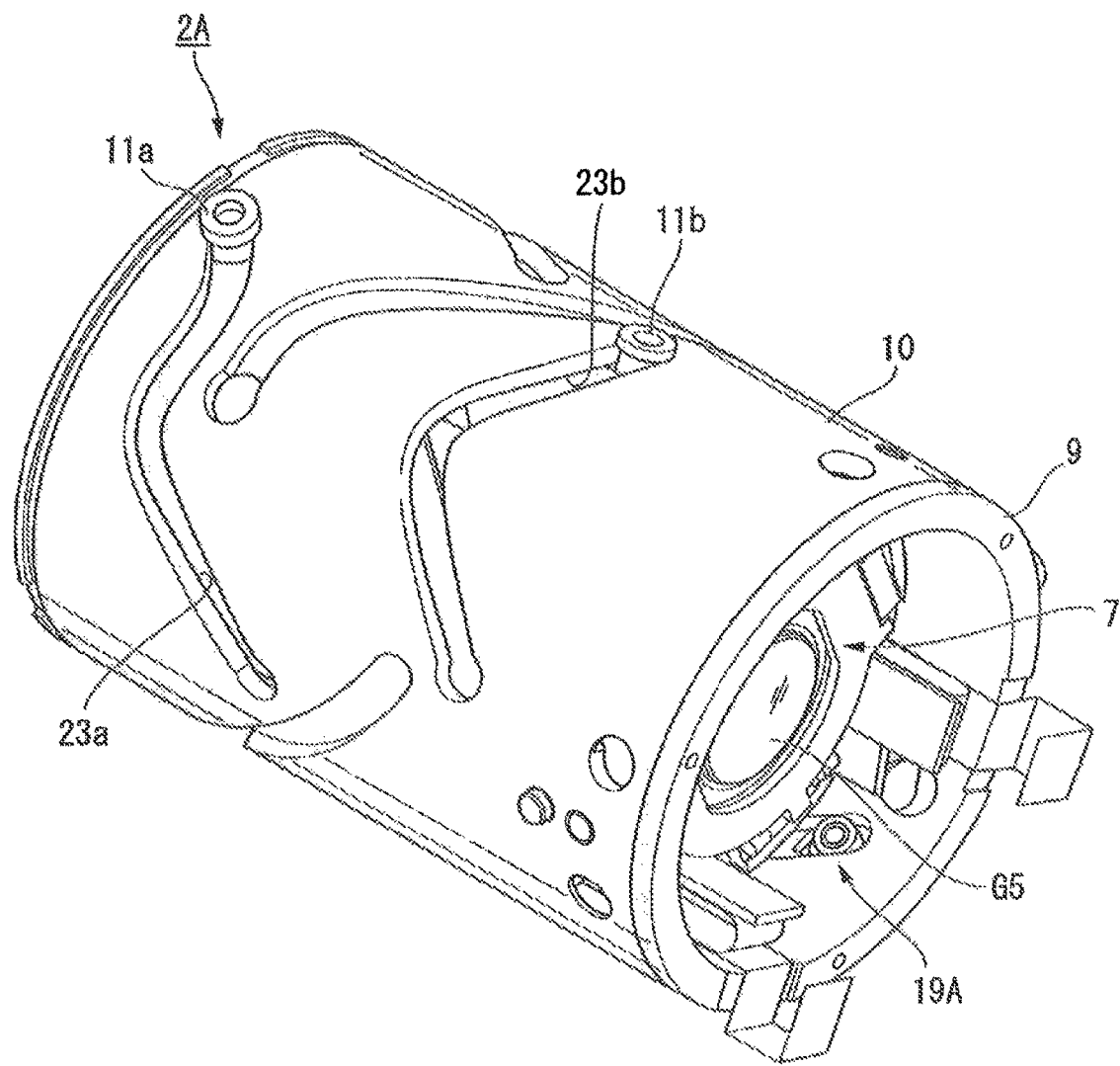
FIG. 2 is a perspective view illustrating an exterior of a lens barrel according to an exemplary embodiment.
Figure 3:
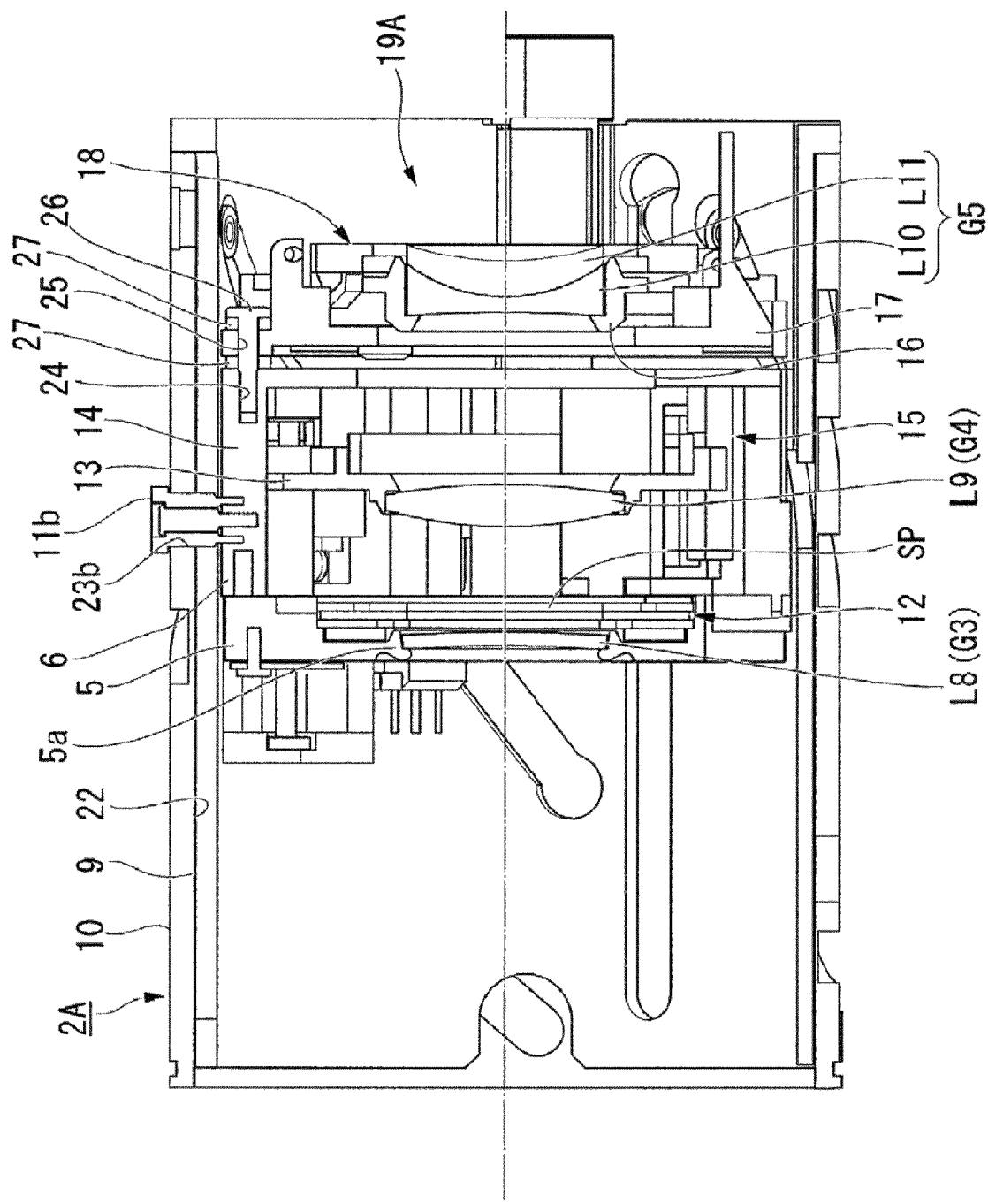
FIG. 3 is a cross sectional view illustrating an inner structure of a lens barrel according to an exemplary embodiment.
Figure 4:
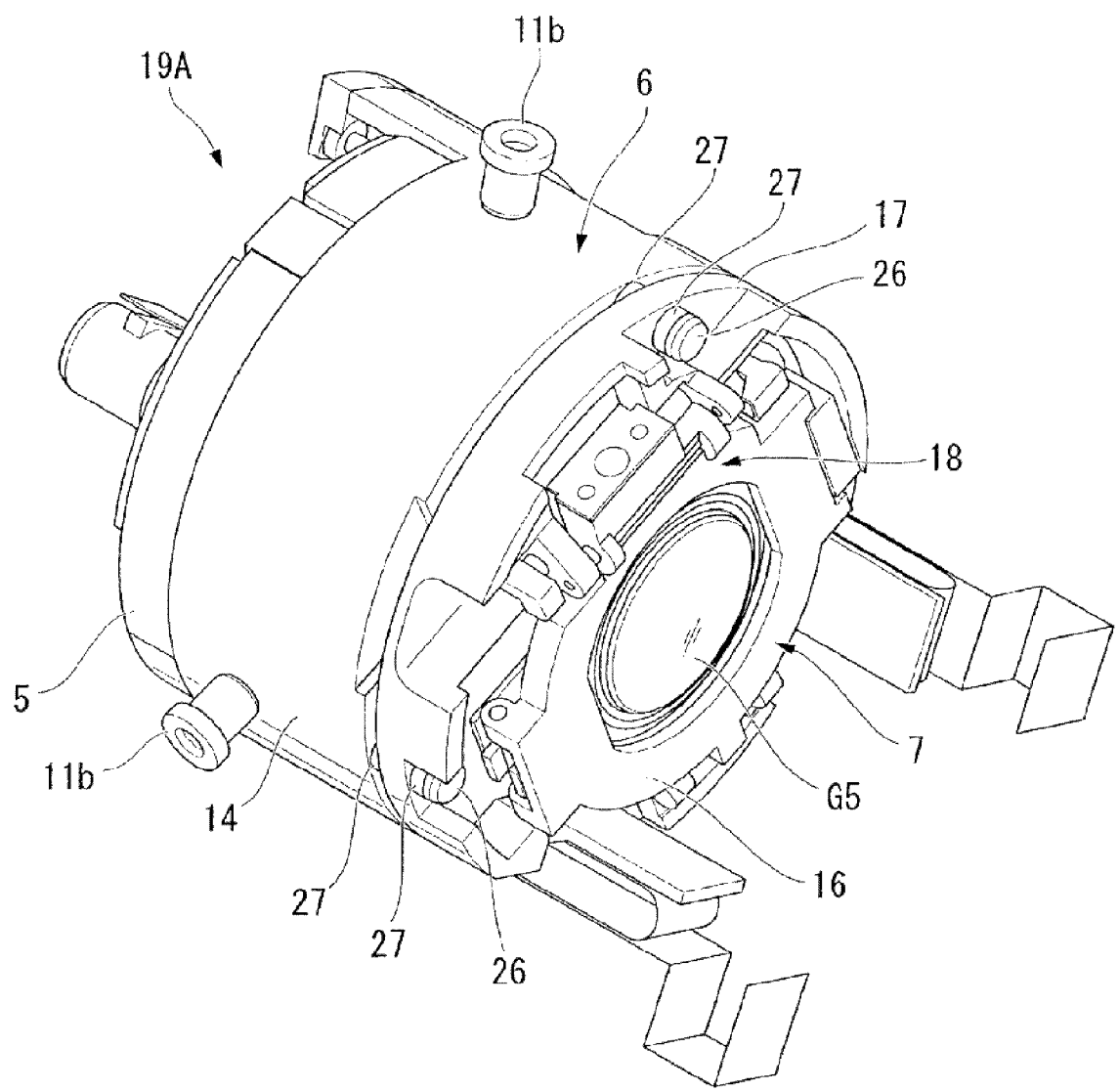
FIG. 4 is a perspective view illustrating an exterior of a retaining unit included in a lens barrel according to an exemplary embodiment.

An interchangeable lens (an optical appliance) 1A for a single lens reflex (SLR) camera according to an exemplary embodiment will be explained first with reference to FIGS. 1 to 5. FIG. 1 is a cross sectional view illustrating an inner structure of an interchangeable lens according to an exemplary embodiment. FIG. 2 is a perspective view illustrating an exterior of a lens barrel according to an exemplary embodiment. FIG. 3 is a cross sectional view illustrating an inner structure of a lens barrel according to an exemplary embodiment. FIG. 4 is a perspective view illustrating an exterior of a retaining unit included in a lens barrel of FIG. 2.

Figure 5:
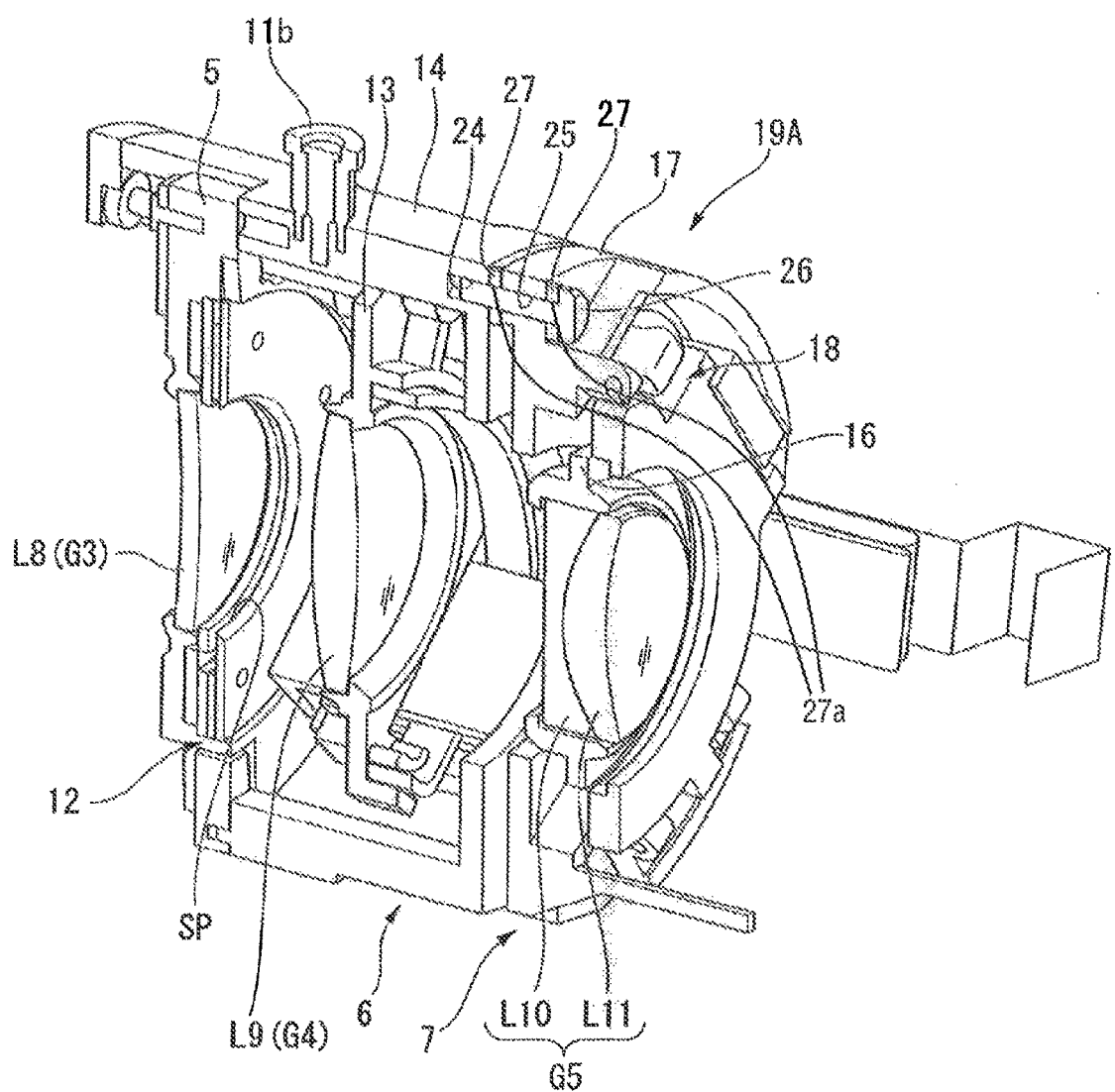
FIG. 5 is a cross sectional view illustrating a retaining unit according to an exemplary embodiment.

FIG. 5 is a cross sectional view illustrating a retaining unit according to an exemplary embodiment.

As shown in FIG. 1, an interchangeable lens 1A includes a lens barrel 2A in which an inner focus zoom lens is disposed. The inner focus zoom lens includes a plurality of lenses L1 to L15 aligned in an optical axis direction of the lens barrel 2A.

More specifically, the zoom lens includes, in sequence from an object side (a front side of the interchangeable lens 1A), a first lens group G1 including the lenses L1, L2, and L3, a second lens group G2 including the lenses L4, L5, L6, and L7, a third lens group G3 including the lens L8, a fourth lens group G4 including the lens L9, a fifth lens group G5 including the lenses L10 and L11, and a sixth lens group G6 including the lenses L12, L13, L14, and L15. An aperture SP is disposed between the third lens group G3 and the fourth lens group G4.

The zoom lens performs zooming by moving the second to the sixth lens groups G2 to G6 in the optical axis direction with respect to the fixed first lens group G1 and performs focusing by moving the fourth lens group G4 in the optical axis direction.

Also, the zoom lens compensates for image shaking caused by hand shaking by moving the fifth lens group G5 in a direction perpendicular to the optical axis direction. However, the configuration of the zoom lens is not limited to the fifteen lenses among the six groups of lenses, and the numbers of lenses or combinations of lenses may be appropriately adjusted.

The lens barrel 2A includes a first lens retaining member 3 to retain the first lens group G1, a second lens retaining member 4 to retain the second lens group G2, a third lens retaining member 5 to retain the third lens group G3, a fourth lens retaining member (a first retaining member) 6 to retain the fourth lens group G4, a fifth lens retaining member (a second retaining member) 7 to retain the fifth lens group G5, a sixth lens retaining member 8 to retain the sixth lens group G6, a fixing cylinder 9 in which the second to the sixth lens retaining members 4 to 8 among the first to the sixth lens retaining members 3 to 8 are disposed, and a cam cylinder 10 which is rotatably disposed around an outer circumference of the fixing cylinder 9 in a circumferential direction, i.e., the fixing cylinder 9 is disposed in the cam cylinder 10, as shown in FIGS. 1, 2, and 3.

The first lens retaining member 3 may be formed in a substantially cylindrical shape and is disposed on a front portion of the fixing cylinder 9, while retaining the first lens group G1 therein.

The second lens retaining member 4 includes a retaining frame 4a to retain the second lens group G2 therein, and the second lens retaining member 4 is disposed in the fixing cylinder 9 to be movable in the optical axis direction. Also, a plurality of first guide pins 11a (shown in FIG. 2) is aligned on an outer circumference of the retaining frame 4a in a circumferential direction. The plurality of first guide pins 11a may include three first guide pins 11a; however, aspects are not limited thereto such that more or fewer first guide pins 11a may be included, for example, 1, 2, or 4 or more first guide pins 11a may be included.

As shown in FIG. 3, the third lens retaining member 5 includes a retaining frame 5a to retain the third lens group G3 therein, and the third lens retaining member 5 may be integrally formed with a front portion of the fourth lens retaining member 6 (i.e., a retaining cylinder 14, which will be described later). Also, an iris unit (an aperture adjusting mechanism) 12 is disposed on a backside surface of the third lens retaining member 5 to adjust an opening of the aperture SP.

The fourth lens retaining member 6 includes a retaining frame 13 to retain the fourth lens group G4 therein, a retaining cylinder 14 to receive the retaining frame 13 therein, and a focus actuator unit (a first driving unit) 15 including a voice coil motor (VCM) to displace the retaining frame 13 in the retaining cylinder 14 in the optical axis direction. The retaining cylinder 14 may be the front portion of the fourth lens retaining member 6 and may be integrally formed with the third lens retaining member 5. The retaining cylinder 14 is disposed in the fixing cylinder 9 to be movable in the optical axis direction. Also, a plurality of second guide pins 11b is aligned on an outer circumference of the retaining cylinder 14 in a circumferential direction. The plurality of second guide pins 11b may include three second guide pins 11b; however, aspects are not limited thereto such that more or fewer second guide pins 11b may be included, for example, 1, 2, or 4 or more second guide pins 11b may be included.

The fifth lens retaining member 7 includes a retaining frame 16 to retain the fifth lens group G5 therein, a support frame 17 to movably support the retaining frame 16 on a surface perpendicular to the optical axis direction, and an anti-vibration actuator unit (a second driving unit) 18 including a piezoelectric element to displace the retaining frame 16 with respect to the support frame 17 in a direction perpendicular to the optical axis direction. The piezoelectric element may be formed to include a ceramic perovskite material, for example, lead zirconate titanate, or another piezoelectric material. The fifth lens retaining member 7 may be integrally formed with a backside surface of the fourth lens retaining member 6 or the retaining cylinder 14 of the fourth lens retaining member 6. To this end, the third, the fourth, and the fifth lens retaining members 5, 6, and 7 may be integrated with each other to form a single retaining unit 19A, as shown in FIG. 4.

The sixth lens retaining member 8 includes a retaining frame 20 to retain the sixth lens group G6 therein and a support frame 21 to movably support the retaining frame 20 on a surface perpendicular to the optical axis. The support frame 21 is disposed in the fixing cylinder 9 to be movable in the optical axis direction. Also, a plurality of third guide pins 11c is aligned on an outer circumference of the support frame 21 in a circumferential direction. The plurality of third guide pins 11c may include three third guide pins 11c; however, aspects are not limited thereto such that more or fewer third guide pins 11c may be included, for example, 1, 2, or 4 or more third guide pins 11b may be included.

The fixing cylinder 9 may be formed in a substantially cylindrical shape and movably supports the second lens retaining member 4, the retaining unit 19A (i.e., the third to the fifth lens retaining members 5, 6, and 7), and the sixth lens retaining member 8 disposed therein in the optical axis direction. More specifically, a plurality of guide slits 22, which extend parallel to the optical axis direction and are of a straight line shape, is aligned on the fixing cylinder 9 in a circumferential direction. The first to the third guide pins 11a to 11c protruding from the outer circumferences of the second, the fourth, and the sixth lens retaining members 4, 6, and 8, respectively, are engaged with the guide slits 22, so that the fixing cylinder 9 can movably support the second lens retaining member 4, the retaining unit 19A (i.e., the third, the fourth, and the fifth lens retaining members 5, 6, and 7), and the sixth lens retaining member 8 in the optical axis direction. The plurality of guide slits 22 may include three guide slits 22; however, aspects are not limited thereto such that more or fewer guide slits 22 may be included, for example, 1, 2, or 4 or more guide slits 22 may be included.

The cam cylinder 10 may be formed in a substantially cylindrical shape and is rotatably disposed around an outer circumference of the fixing cylinder 9 disposed therein in a circumferential direction. More specifically, the cam cylinder 10 includes a plurality of cam slits formed in the circumferential direction, that is, a first cam slit 23a of a curved shape corresponding to a moving trajectory of the second lens group G2, a second cam slit 23b of a curved shape corresponding to a moving trajectory of the third to the fifth lens groups G3 to G5, and a third cam slit 23c of a curved shape corresponding to a moving trajectory of the sixth lens group G6. The curved shape of the first cam slit 23a, as shown in FIG. 2, may extend toward the object side of the interchangeable lens 1A, bend toward a circumferential direction of the cam cylinder 10, and then bend toward the object side of the interchangeable lens 1A. The curved shape of the second cam slit 23b, as shown in FIG. 2, may extend in a circumferential direction of the cam cylinder 10 while bent toward the object side of the interchangeable lens 1A. Although described as the first to third cam slits 23a to 23c, aspects are not limited thereto such that there may be included more or fewer cam slits, for example, 1, 2, or 4 or more cam slits may be included. The first to third guide pins 11a to 11c protruding from the guide slits 22 of the fixing cylinder 9 are engaged with the first to the third cam slits 23a to 23c so that the cam cylinder 10 can be rotatably disposed around the outer circumference of the fixing cylinder 9 in the circumferential direction.

In the lens barrel 2A, the first to the third guide pins 11a to 11c are relatively moved in the guide slits 22 and the first to the third cam slits 23a to 23c by rotating the cam cylinder 10, so that the second lens retaining member 4, the retaining unit 19A (i.e., the third to the fifth lens retaining members 5, 6, and 7), and the sixth lens retaining member 8 can be moved in the fixing cylinder 9 in the optical axis direction, while following trajectories corresponding to the shapes of the first to the third cam slits 23a to 23c.

The interchangeable lens 1A may include a mechanism to perform focusing manually or automatically, a mechanism to detect hand shaking, a mechanism to be installed in an SLR camera, and other parts included in the lens barrel 2A.

If the interchangeable lens 1A is installed in an SLR camera, the interchangeable lens 1A performs zooming by moving the second to the sixth lens groups G2 to G6 in the optical axis direction by rotating the cam cylinder 10 of the lens barrel 2A. Also, the interchangeable lens 1A performs focusing by moving the fourth lens group G4 in the optical axis direction. The focusing according to the moving of the fourth lens group G4 in the optical axis direction may be performed while the interchangeable lens 1A is performing a zooming operation. Also, the interchangeable lens 1A may cancel image shaking caused by hand shaking by moving the fifth lens group G5 in the direction perpendicular to the optical axis direction.

In the lens barrel 2A, the fourth lens retaining member 6 and the fifth lens retaining member 7, which are adjacent to each other in the optical axis direction, may be integrated with each other to form the retaining unit 19A, so that the fourth lens retaining member 6 and the fifth lens retaining member 7 are moved in the fixing cylinder 9, while following the same trajectory. Also, decreases in size and weight of the lens barrel 2A and the interchangeable lens 1A can be achieved by placing the retaining unit 19A in which the parts are compactly arranged as described above in the fixing cylinder 9.

As shown in FIG. 5, in the retaining unit 19A, the fourth lens retaining member 6 and the fifth lens retaining member 7 may be integrated with each other by inserting a plurality of screws 26 into a plurality of screw holes 24 formed on the fourth lens retaining member 6 through a plurality of penetrating holes 25 formed on the fifth lens retaining member 7. The fourth lens retaining member 6 and the fifth lens retaining member 7 may be integrated via, for example, three screws 26 inserted through three penetrating holes 25 into three screw holes 24; however, aspects are not limited thereto such that there may be included more or fewer of each of the screws 26, penetrating holes 25, and screw holes 24, for example, there may be included 1, 2, or 4 or more of each of, independently or simultaneously, the screws 26, penetrating holes 25, and screw holes 24.

However, if the fourth lens retaining member 6 and the fifth lens retaining member 7 are integrated with each other, a vibration absorbing member 27 may be disposed between the fourth lens retaining member 6 and the fifth lens retaining member 7 to absorb vibration, such that transmission of vibration between the fourth lens retaining member 6 and the fifth lens retaining member 7 while moving, for example, to detect each other's locations, may be decreased. The vibration absorbing member 27 may be formed of an elastic material, such as rubber or resin, and has a penetrating hole 27a to allow the screw 26 to penetrate therethrough, and may be disposed between the fourth lens retaining member 6 and the fifth lens retaining member 7. Also, the vibration absorbing member 27 may be disposed between the fifth lens retaining member 6 and a head of the screw 26.

Accordingly, transmission of vibration between the fourth lens retaining member 6 and the fifth lens retaining member 7 may be decreased and an increased degree of precision of location detection may be achieved between the focus actuator unit 15 and the anti-vibration actuator unit 18.

Figure 6:
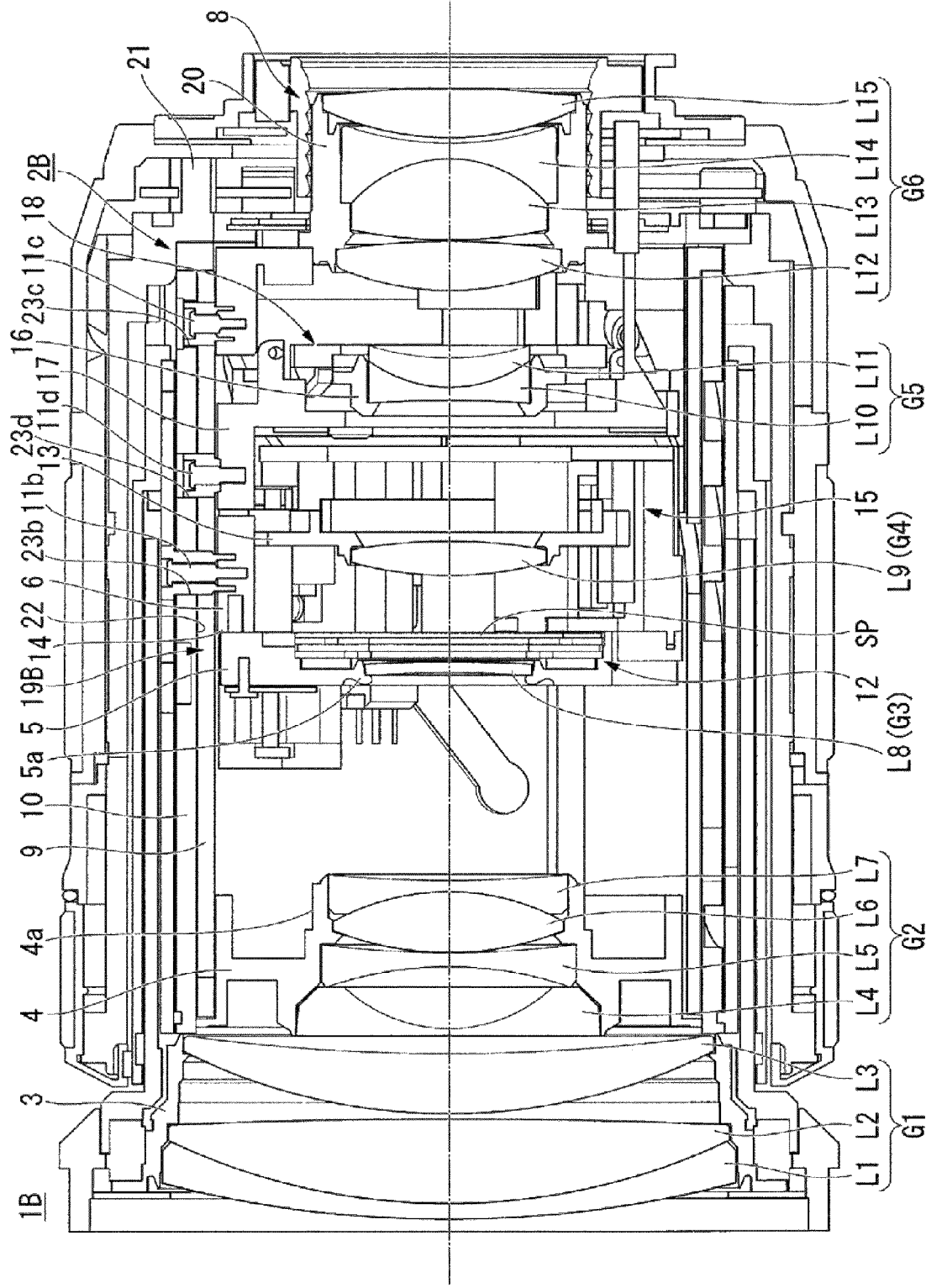
FIG. 6 is a cross sectional view illustrating an inner structure of an interchangeable lens according to an exemplary embodiment.
Figure 7:
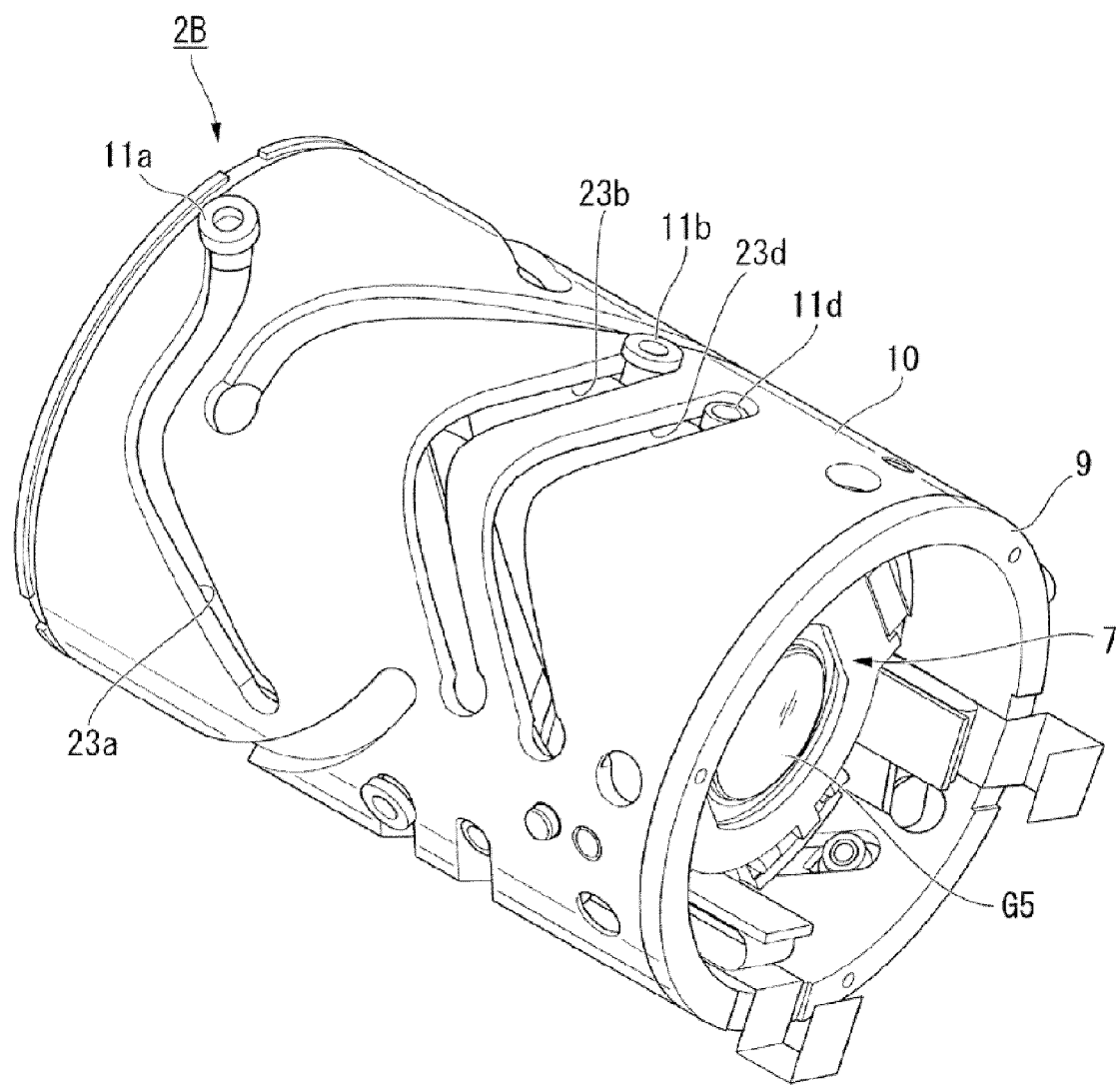
FIG. 7 is a perspective view illustrating an exterior of a lens barrel included in an interchangeable lens according to an exemplary embodiment.
Figure 8:
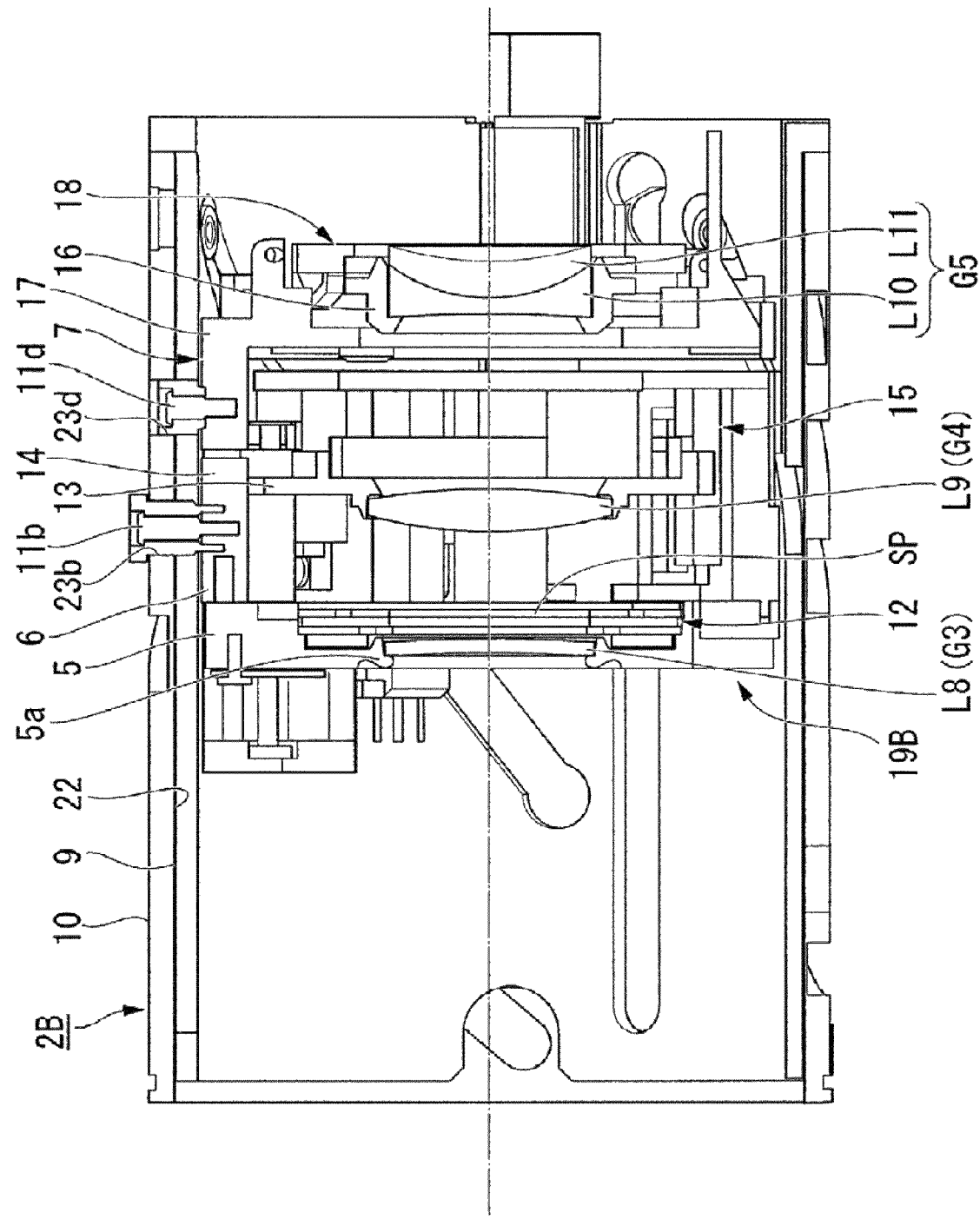
FIG. 8 is a cross sectional view illustrating an inner structure of a lens barrel according to an exemplary embodiment.
Figure 9:
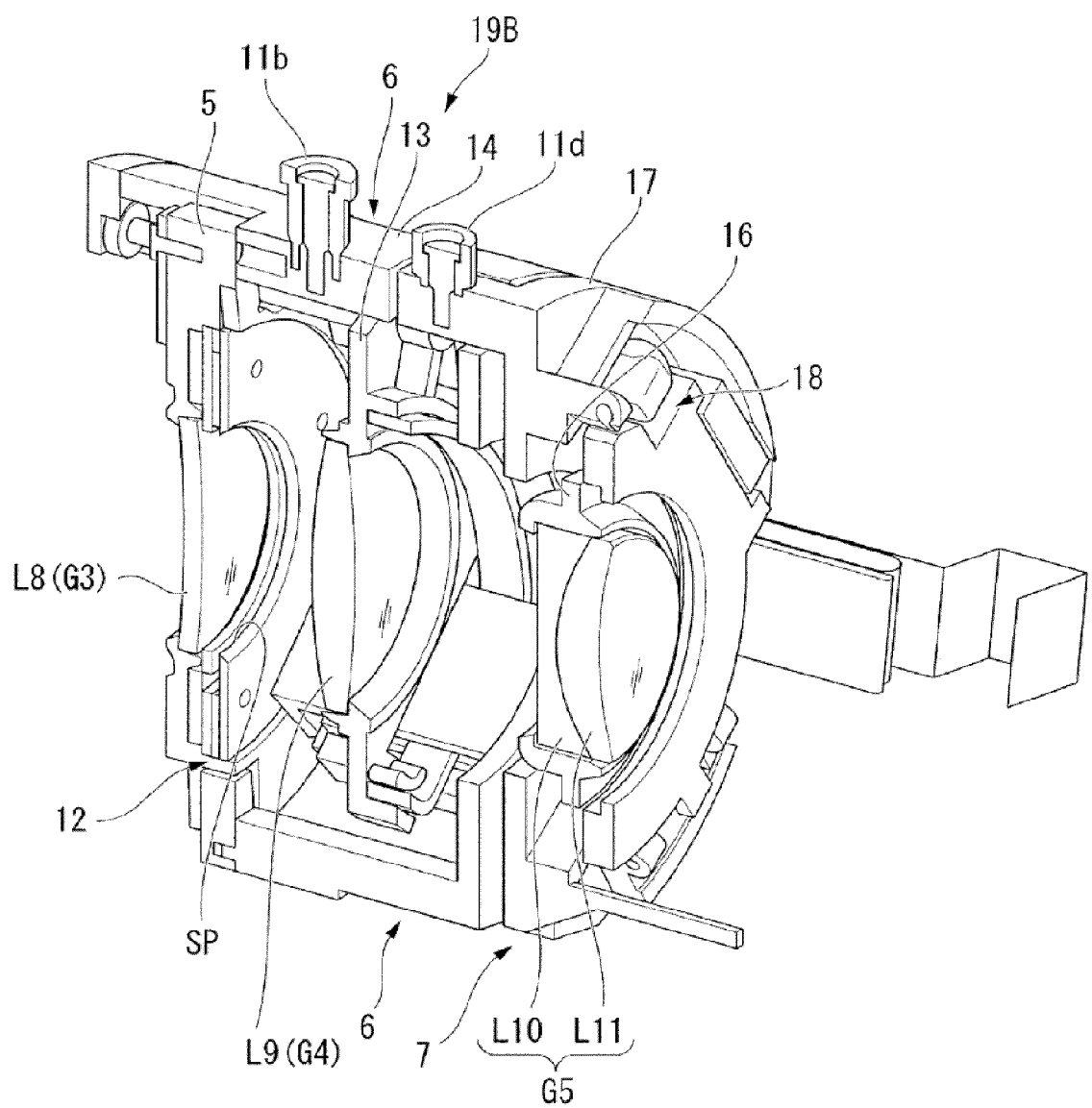
FIG. 9 is a cross sectional view illustrating structures of a fourth lens retaining member and a fifth lens retaining member included in a lens barrel according to an exemplary embodiment.

Hereinafter, an interchangeable lens (an optical appliance) 1B for an SLR camera according to an exemplary embodiment will be explained with reference to FIGS. 6 to 9. FIG. 6 is a cross sectional view illustrating an inner structure of an interchangeable lens according to an exemplary embodiment. FIG. 7 is a perspective view illustrating an exterior of a lens barrel included in an interchangeable lens according to an exemplary embodiment. FIG. 8 is a cross sectional view illustrating an inner structure of a lens barrel according to an exemplary embodiment. FIG. 9 is a cross sectional view illustrating structures of a fourth lens retaining member and a fifth lens retaining member included in a lens barrel according to an exemplary embodiment. In the following explanation, the same parts as those in the interchangeable lens 1A are referred to by the same reference numerals.

As shown in FIG. 6, an interchangeable lens 1B includes a lens barrel 2B in which an inner focus zoom lens is disposed. The inner focus zoom lens includes a plurality of lenses L1 to L15 aligned in an optical axis direction.

More specifically, the zoom lens includes, in sequence from an object side (a front side of the interchangeable lens 1B), a first lens group G1 including the lenses L1, L2, and L3, a second lens group G2 including the lenses L4, L5, L6, and L7, a third lens group G3 including the lens L8, a fourth lens group G4 including the lens L9, a fifth lens group G5 including the lenses L10 and L11, and a sixth lens group G6 including the lenses L12, L13, L14, and L15. An aperture SP is disposed between the third lens group G3 and the fourth lens group G4.

The zoom lens performs zooming by moving the second to the sixth lens groups G2 to G6 in the optical axis direction with respect to the fixed first lens group G1 and performs focusing by moving the fourth lens group G4 in the optical axis direction.

The zoom lens compensates for image shaking caused by hand shaking by moving the fifth lens group G5 in a direction perpendicular to the optical axis direction. The configuration of the zoom lens is not limited to the fifteen lenses among the six groups of lenses, and the numbers of lenses or combinations of lenses may be appropriately adjusted.

The lens barrel 2B includes a first lens retaining member 3 to retain the first lens group G1, a second lens retaining member 4 to retain the second lens group G2, a third lens retaining member 5 to retain the third lens group G3, a fourth lens retaining member (a first retaining member) 6 to retain the fourth lens group G4, a fifth lens retaining member (a second retaining member) 7 to retain the fifth lens group G5, a sixth lens retaining member 8 to retain the sixth lens group G6, a fixing cylinder 9 to receive the second to the sixth lens retaining members 4 to 8 among the first to the sixth lens retaining members 3 to 8, and a cam cylinder 10 which is rotatably disposed around an outer circumference of the fixing cylinder 9 in a circumferential direction, i.e., the fixing cylinder 9 is disposed in the cam cylinder 10, as shown in FIGS. 6, 7, and 8.

The first lens retaining member 3 may be formed in a substantially cylindrical shape and is disposed on a front portion of the fixing cylinder 9, while receiving the first lens group G1 therein.

The second lens retaining member 4 includes a retaining frame 4a to retain the second lens group G2 therein, and the second lens retaining member 4 is disposed in the fixing cylinder 9 to be movable in the optical axis direction. A plurality of first guide pins 11a (shown in FIG. 7) is aligned on an outer circumference of the retaining frame 4a in a circumferential direction. The plurality of first guide pins 11a may include three first guide pins 11a; however, aspects are not limited thereto such that more or fewer first guide pins 11a may be included, for example, 1, 2, or 4 or more first guide pins 11a may be included.

As shown in FIG. 8, the third lens retaining member 5 includes a retaining frame 5a to retain the third lens group G3 therein, and the third lens retaining member 5 may be integrally formed with a front portion of the fourth lens retaining member 6 (i.e., a retaining cylinder 14, which will be described later). That is, the third lens retaining member 5 and the fourth lens retaining member 6 may be integrated with each other to form a single retaining member 19B, as shown in FIG. 9. Also, an iris unit (an aperture adjusting mechanism) 12 is disposed on a backside surface of the third lens retaining member 5 to adjust an opening of the aperture SP.

The fourth lens retaining member 6 includes a retaining frame 13 to retain the fourth lens group G4 therein, a retaining cylinder 14 to receive the retaining frame 13 therein, and a focus actuator unit (a first driving unit) 15 including a voice coil motor (VCM) to displace the retaining frame 13 in the retaining cylinder 14 in the optical axis direction. The retaining cylinder 14 may be the front portion of the fourth lens retaining member 6 and may be integrally formed with the third lens retaining member 5. The retaining cylinder 14 is disposed in the fixing cylinder 9 to be movable in the optical axis direction. A plurality of second guide pins 11b is aligned on an outer circumference of the retaining cylinder 14 in a circumferential direction. The plurality of second guide pins 11b may include three second guide pins 11b; however, aspects are not limited thereto such that more or fewer second guide pins 11b may be included, for example, 1, 2, or 4 or more second guide pins 11b may be included.

The fifth lens retaining member 7 includes a retaining frame 16 to retain the fifth lens group G5 therein, a support frame 17 to movably support the retaining frame 16 on a surface perpendicular to the optical axis direction, and an anti-vibration actuator unit (a second driving unit) 18 including a piezoelectric element to displace the retaining frame 16 with respect to the support frame 17 in a direction perpendicular to the optical axis direction. The piezoelectric element may be formed to include a ceramic perovskite material, for example, lead zirconate titanate, or another piezoelectric material. A plurality of fourth guide pins 11d is aligned on an outer circumference of the support frame 17 in a circumferential direction. The plurality of fourth guide pins 11d may include three fourth guide pins 11d; however, aspects are not limited thereto such that more or fewer fourth guide pins 11d may be included, for example, 1, 2, or 4 or more fourth guide pins 11d may be included.

The sixth lens retaining member 8 includes a retaining frame 20 to retain the sixth lens group G6 therein and a support frame 21 to movably support the retaining frame 20 on a surface perpendicular to the optical axis. The support frame 21 is disposed in the fixing cylinder 9 to be movable in the optical axis direction. Also, a plurality of third guide pins 11c is aligned on an outer circumference of the support frame 21 in a circumferential direction. The plurality of third guide pins 11c may include three third guide pins 11c; however, aspects are not limited thereto such that more or fewer third guide pins 11c may be included, for example, 1, 2, or 4 or more third guide pins 11b may be included.

The fixing cylinder 9 may be formed in a substantially cylindrical shape and movably supports the second lens retaining member 4, the retaining unit 19B (i.e., the third and the fourth lens retaining members 5 and 6), the fifth lens retaining member 7, and the sixth lens retaining member 8 disposed therein in the optical axis direction. More specifically, a plurality of guide slits 22, which extend parallel to the optical axis direction and are of a straight line shape, is aligned on the fixing cylinder 9 in a circumferential direction. The plurality of guide slits 22 may include three guide slits 22; however, aspects are not limited thereto such that more or fewer guide slits 22 may be included, for example, 1, 2, or 4 or more guide slits 22 may be included.

The first to the fourth guide pins 11a to 11d protruding from the outer circumferences of the second, the fourth, the fifth, and the sixth lens retaining members 4, 6, 7, and 8, respectively, are engaged with the guide slits 22, so that the fixing cylinder 9 can movably support the second lens retaining member 4, the retaining unit 19B (i.e., the third and the fourth lens retaining members 5 and 6), the fifth lens retaining member 7, and the sixth lens retaining member 8 in the optical axis direction.

The can cylinder 10 may be formed in a substantially cylindrical shape and is rotatably disposed around the outer circumference of the fixing cylinder 9 disposed therein in the circumferential direction. More specifically, the cam cylinder 10 includes a plurality of cam slits formed in the circumferential direction, that is, a first cam slit 23a of a curved shape corresponding to a moving trajectory of the second lens group G2, a second cam slit 23b of a curved shape corresponding to a moving trajectory of the third and the fourth lens groups G3 and G4, a fourth cam slit 23d of a curved shape corresponding to a moving trajectory of the fifth lens group G5, and a third cam slit 23c of a curved shape corresponding to a moving trajectory of the sixth lens group G6. The curved shape of the first cam slit 23a, as shown in FIG. 7, may extend toward the object side of the interchangeable lens 1B, bend toward a circumferential direction of the cam cylinder 10, and then bend toward the object side of the interchangeable lens 1B. The curved shapes of the second cam slit 23b and the fourth cam slit 23d, as shown in FIG. 7, may each extend in a circumferential direction of the cam cylinder 10 while bent toward the object side of the interchangeable lens 1B. Further, the curved shapes of the second cam slit 23b and the fourth cam slit 23d may be a same shape. Although described as the first to fourth cam slits 23a to 23d, aspects are not limited thereto such that there may be included more or fewer cam slits, for example, 1, 2, 3, or 5 or more cam slits may be included.

The first to the fourth guide pins 11a to 11d protruding from the guide slits 22 of the fixing cylinder 9 are engaged with the first to the fourth cam slits 23a to 23d so that the cam cylinder 10 can be rotatably disposed around the outer circumference of the fixing cylinder 9 in the circumferential direction.

In the lens barrel 2B, the first to the fourth guide pins 11a to 11d are relatively moved in the guide slits 22 and the first to the fourth cam slits 23a to 23d by rotating the cam cylinder 10, so that the second lens retaining member 4, the retaining unit 19B (i.e., the third and the fourth lens retaining members 5 and 6), the fifth lens retaining member 7, and the sixth lens retaining member 8 can be moved in the fixing cylinder 9 in the optical axis direction, while following trajectories corresponding to the shapes of the first through the fourth cam slits 23a to 23d.

The interchangeable lens 1B may include a mechanism to perform focusing manually or automatically, a mechanism to detect hand shaking, a mechanism to be installed in an SLR camera, and other parts included in the lens barrel 2B.

If the interchangeable lens 1B is installed in an SLR camera, the interchangeable lens 1B performs zooming by moving the second to the sixth lens groups G2 to G6 in the optical axis direction by rotating the cam cylinder 10 of the lens barrel 2B. Also, the interchangeable lens 1B performs focusing by moving the fourth lens group G4 in the optical axis direction. The focusing according to the moving of the fourth lens group G4 in the optical axis direction may be performed while the interchangeable lens 1B is performing a zooming operation. Also, the interchangeable lens 1B may cancel image shaking caused by hand shaking by moving the fifth lens group G5 in the direction perpendicular to the optical axis direction.

In the lens barrel 2B, the second cam slit 23b and the fourth cam slit 23d are formed to follow the same trajectory so that the fourth lens retaining member 6 and the fifth lens retaining member 7, which are adjacent to each other in the optical axis direction, can be moved in the fixing cylinder 9, while following the same trajectory. By arranging the fourth lens retaining member 6 and the fifth lens retaining member 7, which are moved following the same trajectory, adjacent to each other in the fixing cylinder 9, decreases in size and weight of the lens barrel 2B and the interchangeable lens 1B may be achieved.

However, if the fourth lens retaining member 6 and the fifth lens retaining member 7 are disposed adjacent to each other in the fixing cylinder 9 as shown in FIG. 9, the second guide pins 11b of the fourth lens retaining member 6 and the fourth guide pins 11d of the fifth lens retaining member 7 may be engaged with the second cam slit 23b and the fourth cam slit 23d of the cam cylinder 10, respectively, such that transmission of vibration between the fourth lens retaining member 6 and the fifth lens retaining member 7 while moving, for example, to detect each other's locations, may be decreased. In this case, the fourth lens retaining member 6 and the fifth lens retaining member 7 are maintained in a non-contact state and allow a path of vibration transmission to be extended between the second guide pins 11b and the fourth guide pins 11d. Also, since a direction in which the vibration is transmitted is changed between the second guide pins 11b and the fourth guide pins 11d, transmission of vibration may be decreased.

To this end, vibration transmission between the fourth lens retaining member 6 and the fifth lens retaining member 7 may be decreased, and an increased degree of precision of location detection may be achieved between the focus actuator unit 15 and the anti-vibration actuator unit 18.

Figure 10:
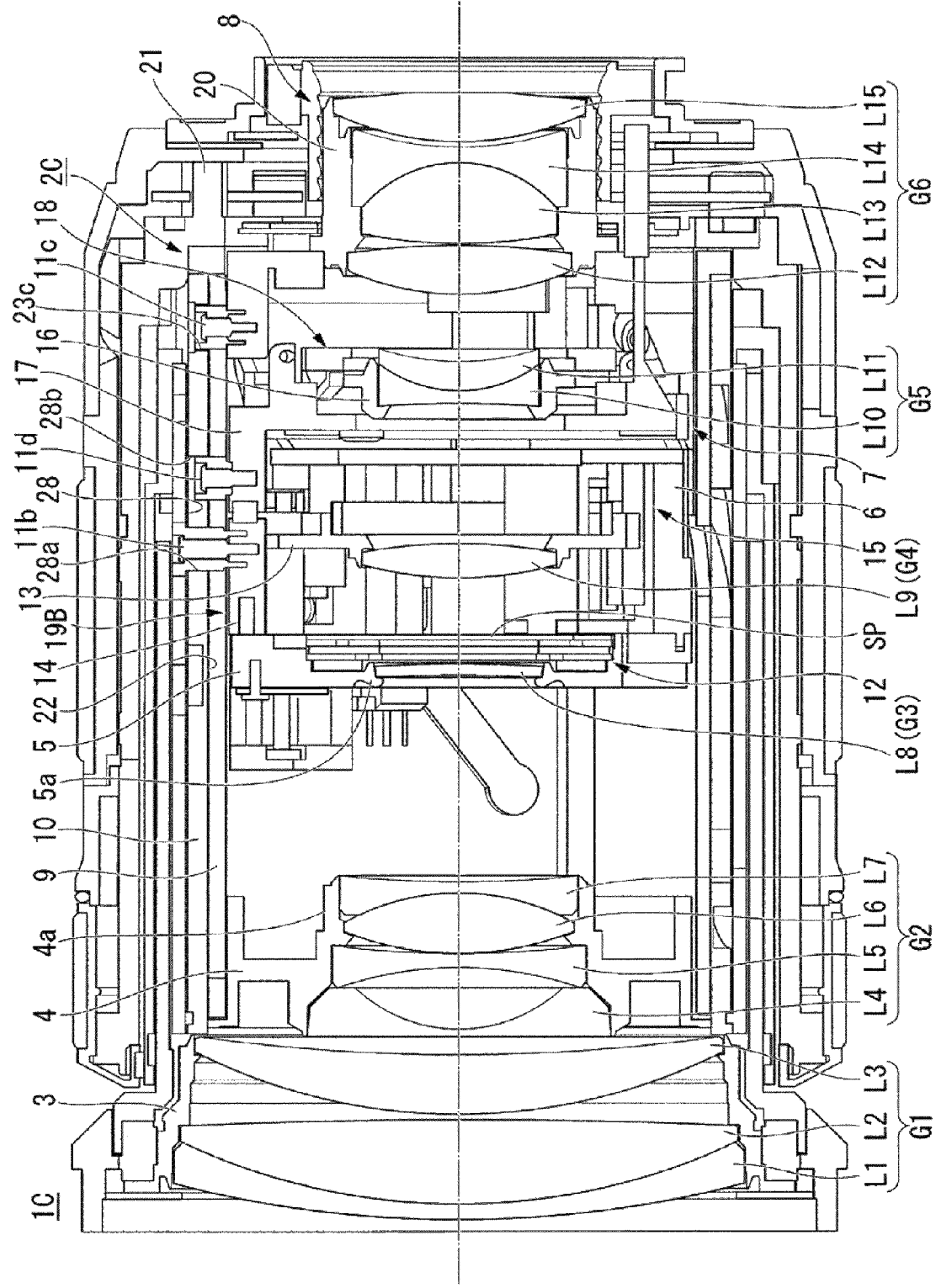
FIG. 10 is a cross sectional view illustrating an inner structure of an interchangeable lens according to an exemplary embodiment.

Next, an interchangeable lens (an optical appliance) 10 for an SLR camera according to an exemplary embodiment will be explained with reference to FIG. 10. FIG. 10 is a cross sectional view illustrating an inner structure of an interchangeable lens according to an exemplary embodiment. In the following explanation, the same parts as those in the interchangeable lenses 1A and 1B are referred to by the same reference numerals.

The interchangeable lens 10 includes a lens barrel 2C in which an inner focus zoom lens is disposed. The inner focus zoom lens includes a plurality of lenses L1 to L15 aligned in an optical axis direction.

More specifically, the zoom lens includes, in sequence from an object side (a front side of the interchangeable lens 10), a first lens group G1 including the lenses L1, L2, and L3, a second lens group G2 including the lenses L4, L5, L6, and L7, a third lens group G3 including the lens L8, a fourth lens group G4 including the lens L9, a fifth lens group G5 including the lenses L10 and L11, and a sixth lens group G6 including the lenses L12, L13, L14, and L15. Also, an aperture SP is disposed between the third lens group G3 and the fourth lens group G4.

The zoom lens performs zooming by moving the second to the sixth lens groups G2 to G6 in the optical axis direction with respect to the fixed first lens group G1 and performs focusing by moving the fourth lens group G4 in the optical axis direction.

The zoom lens compensates for image shaking caused by hand shaking by moving the fifth lens group G5 in a direction perpendicular to the optical axis direction. The configuration of the zoom lens is not limited to the 15 lenses among the six groups of lenses and the numbers of lenses and combinations of lenses may be appropriately adjusted.

Figure 11:
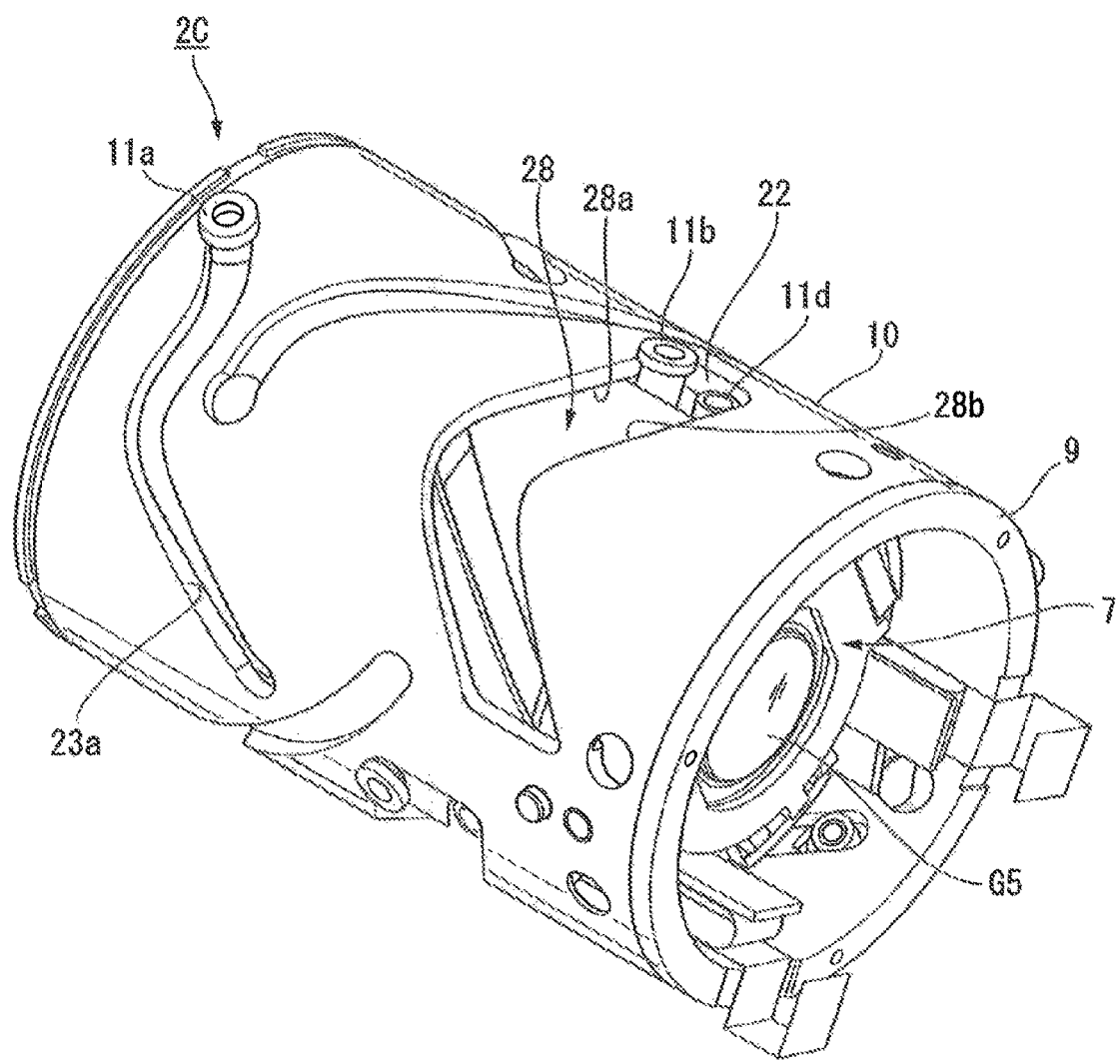
FIG. 11 is a perspective view illustrating an exterior of a lens barrel included in an interchangeable lens according to an exemplary embodiment.
Figure 12:
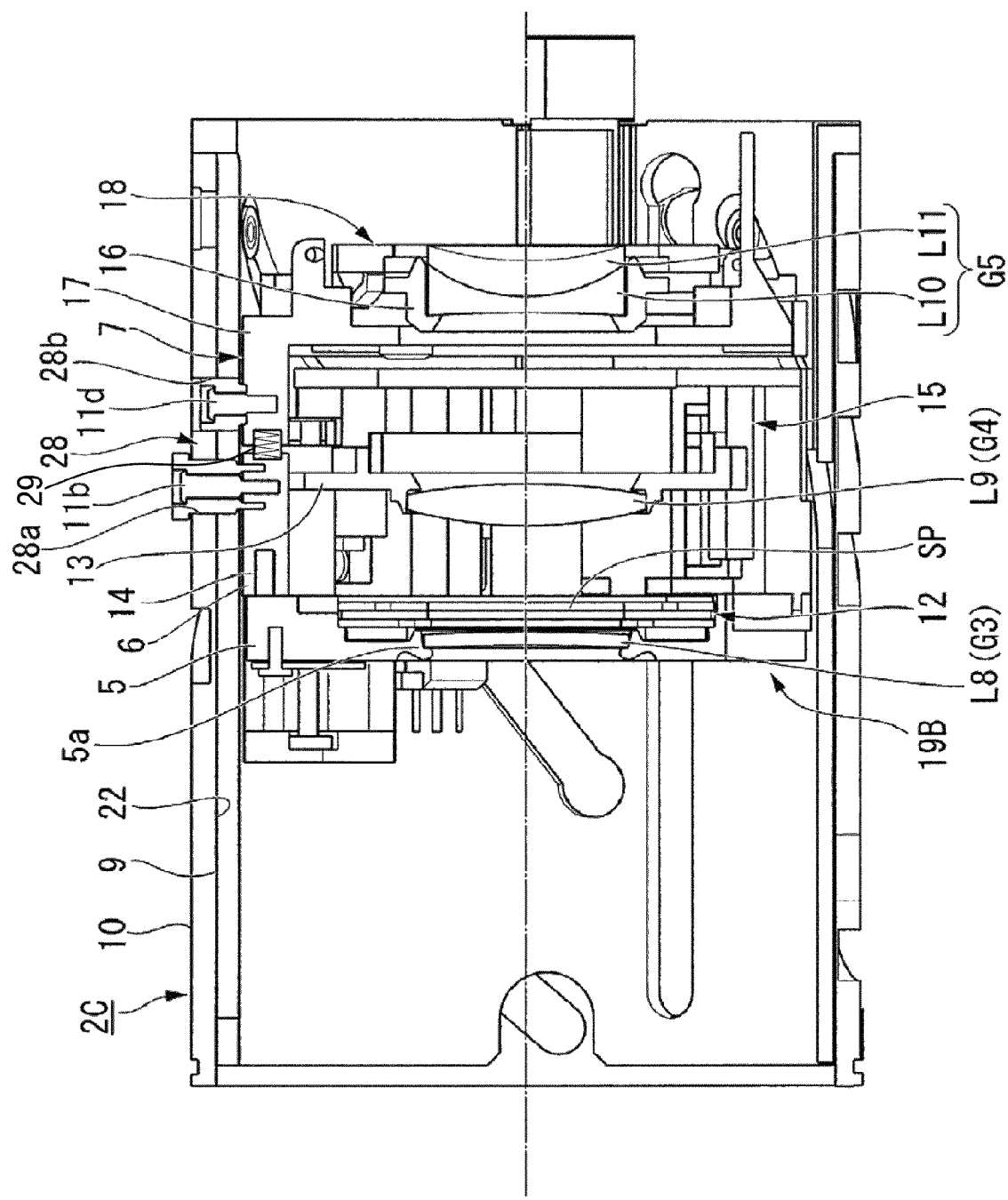
FIG. 12 is a cross sectional view illustrating an inner structure of a lens barrel according to an exemplary embodiment.

The lens barrel 2C includes a first lens retaining member 3 to retain the first lens group G1, a second lens retaining member 4 to retain the second lens group G2, a third lens retaining member 5 to retain the third lens group G3, a fourth lens retaining member (a first retaining member) 6 to retain the fourth lens group G4, a fifth lens retaining member (a second retaining member) 7 to retain the fifth lens group G5, a sixth lens retaining member 8 to retain the sixth lens group G6, a fixing cylinder 9 to receive the second to the fifth lens retaining members 4 to 7 among the first to the sixth lens retaining members 3 to 8, and a cam cylinder 10 which is rotatably disposed around an outer circumference of the fixing cylinder 9 in a circumferential direction, i.e., the fixing cylinder 9 is disposed in the cam cylinder 10, as shown in FIGS. 10, 11, and 12.

The first lens retaining member 3 may be formed in a substantially cylindrical shape and is disposed on a front portion of the fixing cylinder 9, while retaining the first lens group G1 therein.

The second lens retaining member 4 includes a retaining frame 4a to retain the second lens group G2 therein, and the second lens retaining member 4 is disposed in the fixing cylinder 9 to be movable in the optical axis direction. A plurality of first guide pins 11a (shown in FIG. 11) is aligned on an outer circumference of the retaining frame 4a in a circumferential direction. The plurality of first guide pins 11a may include three first guide pins 11a; however, aspects are not limited thereto such that more or fewer first guide pins 11a may be included, for example, 1, 2, or 4 or more first guide pins 11a may be included.

As shown in FIG. 12, the third lens retaining member 5 includes a retaining frame 5a to retain the third lens group G3 therein, and the third lens retaining member 5 may be integrally formed with a front portion of the fourth lens retaining member 6 (i.e., a retaining cylinder 14, which will be described later). That is, the third lens retaining member 5 and the fourth lens retaining member 6 may be integrated with each other to form a single retaining unit 19B. Also, an iris unit (an aperture adjusting mechanism 12) is disposed on a backside surface of the third lens retaining member 5 to adjust an opening of the aperture SP.

Figure 13:
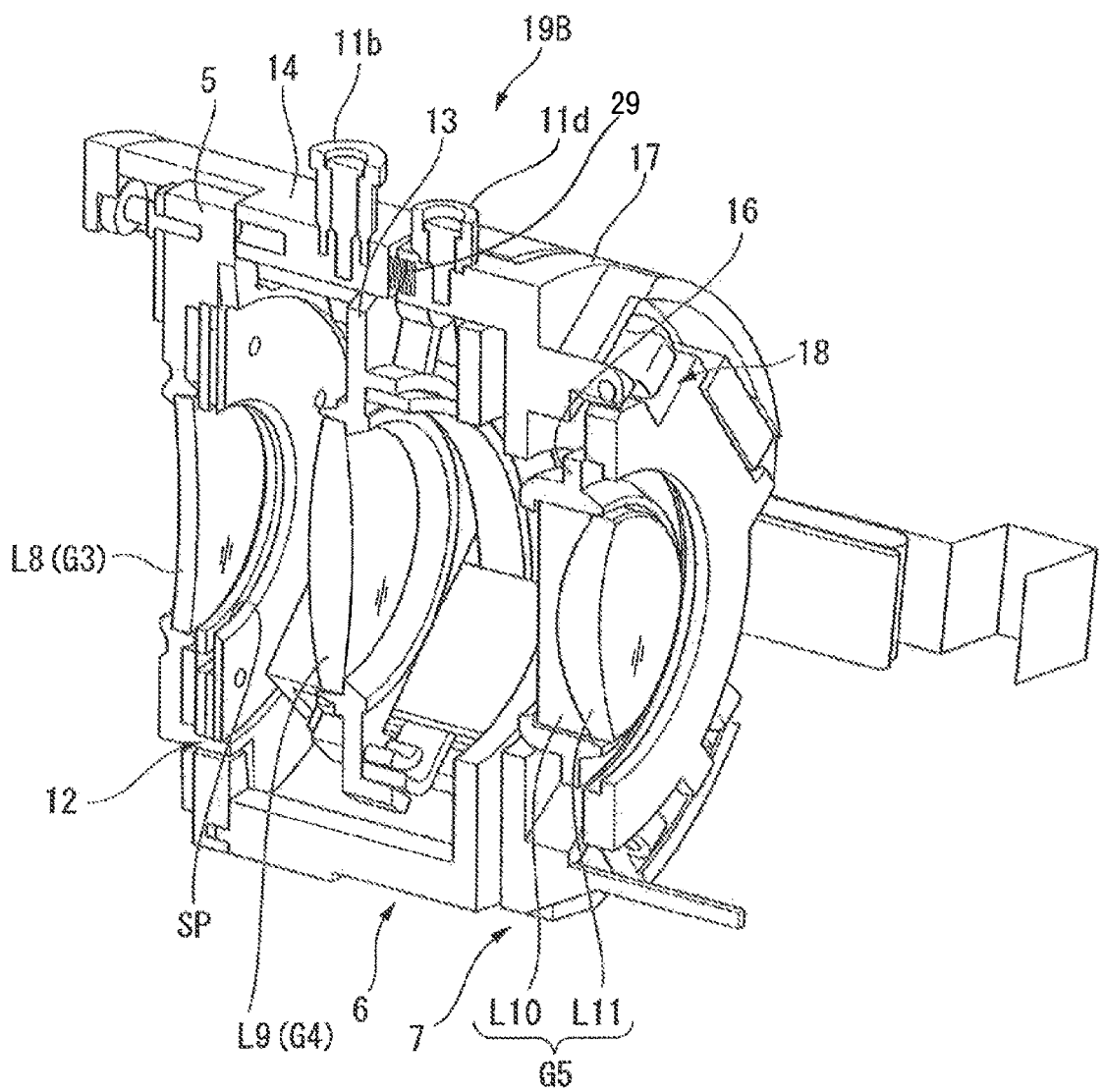
FIG. 13 is a cross sectional view illustrating a fourth lens retaining member and a fifth lens retaining member included in a lens barrel according to an exemplary embodiment.

As shown in FIG. 13, the fourth lens retaining member 6 includes a retaining frame 13 to retain the fourth lens group G4 therein, a retaining cylinder 14 to receive the retaining frame 13 therein, and a focus actuator unit (a first driving unit) 15 including a voice coil motor (VCM) to displace the retaining frame 13 in the retaining cylinder 14 in the optical axis direction. The retaining cylinder 14 may be the front portion of the fourth lens retaining member 6 and may be integrally formed with the third lens retaining member 5. The retaining cylinder 14 is disposed in the fixing cylinder 9 to be movable in the optical axis direction. A plurality of second guide pins 11*b* is aligned on an outer circumference of the retaining cylinder 14 in a circumferential direction. The plurality of second guide pins 11*b* may include three second guide pins 11*b*; however, aspects are not limited thereto such that more or fewer second guide pins 11*b* may be included, for example, 1, 2, or 4 or more second guide pins 11*b* may be included.

The fifth lens retaining member 7 includes a retaining frame 16 to retain the fifth lens group G5 therein, a support frame 17 to movably support the retaining frame 16 on a surface perpendicular to the optical axis direction, and an anti-vibration actuator unit (a second driving unit) 18 including a piezoelectric element to displace the retaining frame 16 with respect to the support frame 17 in the direction perpendicular to the optical axis direction. The piezoelectric element may be formed to include a ceramic perovskite material, for example, lead zirconate titanate, or another piezoelectric material. A plurality of fourth guide pins 11*d* is aligned on an outer circumference of the support frame 17 in a circumferential direction. The plurality of fourth guide pins 11*d* may include three fourth guide pins 11*d*; however, aspects are not limited thereto such that more or fewer fourth guide pins 11*d* may be included, for example, 1, 2, or 4 or more fourth guide pins 11*d* may be included.

The sixth lens retaining member 8 includes a retaining frame 20 to retain the sixth lens group G6 therein and a support frame 21 to movably support the retaining frame 20 on a surface perpendicular to the optical axis. The support frame 21 is disposed in the fixing cylinder 9 to be movable in the optical axis direction. Also, a plurality of third guide pins 11*c* is aligned on an outer circumference of the support frame 21 in a circumferential direction. The plurality of third guide pins 11*c* may include three third guide pins 11*c*; however, aspects are not limited thereto such that more or fewer third guide pins 11*c* may be included, for example, 1, 2, or 4 or more third guide pins 11*b* may be included.

The fixing cylinder 9 may be formed in a substantially cylindrical shape and movably supports the second lens retaining member 4, the retaining unit 19B (i.e., the third and the fourth lens retaining members 5 and 6), the fifth lens retaining member 7, and the sixth lens retaining member 8 disposed therein in the optical axis direction. More specifically, a plurality of guide slits 22, which extend parallel to the optical axis direction and are of a straight line shape, is aligned on the fixing cylinder 9 in the circumferential direction. The plurality of guide slits 22 may include three guide slits 22; however, aspects are not limited thereto such that more or fewer guide slits 22 may be included, for example, 1, 2, or 4 or more guide slits 22 may be included.

The first to the fourth guide pins 11*a* to 11*d* protruding from the outer circumferences of the second, the fourth, the fifth, and the sixth lens retaining members 4, 6, 7, and 8, respectively, are engaged with the guide slits 22, so that the fixing cylinder 9 can movably support the second lens retaining member 4, the retaining unit 19B (i.e., the third and the fourth lens retaining members 5 and 6), the fifth lens retaining member 7, and the sixth lens retaining member 8 in the optical axis direction.

The cam cylinder 10 may be formed in a substantially cylindrical shape and is rotatably disposed around an outer circumference of the fixing cylinder 9 disposed therein in a circumferential direction. More specifically, the cam cylinder 10 includes a plurality of cam slits formed in a circumferential direction, that is, a first cam slit 23*a* of a curved shape corresponding to a moving trajectory of the second lens group G2, a second cam slit 28 including a first cam portion 28*a* of a curved shape corresponding to a moving trajectory of the third and the fourth lens groups G3 and G4 and a second cam portion 28*b* of a curved shape corresponding to the fifth lens group G5, and a third cam slit 23*c* of a curved shape corresponding to a moving trajectory of the sixth lens group G6. The curved shape of the first cam slit 23*a*, as shown in FIG. 11, may extend toward the object side of the interchangeable lens 10, bend toward a circumferential direction of the cam cylinder 10, and then bend toward the object side of the interchangeable lens 10. The curved shape of the second cam slit 28, as shown in FIG. 11, may extend in a circumferential direction of the cam cylinder 10 while bent toward the object side of the interchangeable lens 10. Although described as the first cam slit 23*a*, the second cam slit 28, and the third cam slit 23*c*, aspects are not limited thereto such that there may be included more or fewer cam slits, for example, 1, 2, or 4 or more cam slits may be included.

The first to the fourth guide pins 11*a* to 11*d* protruding from the guide slits 22 of the fixing cylinder 9 are engaged with the first to the third cam slits 23*a*, 28, and 23*c*, so that the cam cylinder 10 can be rotatably disposed around the outer circumference of the fixing cylinder 9 in the circumferential direction.

The second guide pins 11*b* contact the first cam portion 28*a* formed on an edge of one side of the second cam slit 28 and the fourth guide pins 11*d* contact the second cam portion 28*b* formed on an edge of the other side of the second cam slit 28. A plurality of spring members 29 may be disposed between the fourth lens retaining member 6 and the fifth lens retaining member 7 to bias the fourth lens retaining member 6 and the fifth lens retaining member 7 in a direction for isolating them from each other. The plurality of spring members 29 may include three spring members 29; however, aspects are not limited thereto such that more or fewer spring members 29 may be included, for example, 1, 2, or 4 or more spring members 29 may be included.

In the lens barrel 2C, the first to the fourth guide pins 11*a* to 11*d* are relatively moved in the guide slits 22 and the first to the third cam slits 23*a*, 28, and 23*c* by rotating the cam cylinder 10, so that the second lens retaining member 4, the retaining unit 19B (i.e., the third and the fourth lens retaining members 5 and 6), the fifth lens retaining member 7, and the sixth lens retaining member 8 are moved in the fixing cylinder 9 in the optical axis direction, while following trajectories corresponding to the shape of the first to the third cam slits 23*a*, 28, and 23*c*.

The interchangeable lens 10 may include a mechanism to perform focusing manually or automatically, a mechanism to detect hand shaking, a mechanism to be installed an SLR camera, and other parts included in the lens barrel 2C.

If the interchangeable lens 10 is installed in an SLR camera, the interchangeable lens 10 performs zooming by moving the second to the sixth lens group G2 to G6 in the optical axis direction by rotating the cam cylinder 10 of the lens barrel 2C. Also, the interchangeable lens 10 performs focusing by moving the fourth lens group G4 in the optical axis direction. The focusing according to the moving of the fourth lens group G4 in the optical axis direction may be performed while the interchangeable lens 10 is performing a zooming operation. Also, the interchangeable lens 10 may cancel image shaking caused by hand shaking by moving the fifth lens group G5 in the direction perpendicular to the optical axis direction.

In the lens barrel 2C, the first cam portion 28*a* and the second cam portion 28*b* of the second cam slit 28 are formed to draw or follow the same trajectory, so that the fourth lens retaining member 6 and the fifth lens retaining member 7, which are adjacent to each other in the optical axis direction, can be moved in the fixing cylinder 9, drawing or following the same trajectory. By arranging the fourth lens retaining member 6 and the fifth lens retaining member 7, which are moved following the same trajectory, adjacent to each other in the fixing cylinder 9, decreases in size and weight of the lens barrel 2C and the interchangeable 10 may be achieved.

However, if the fourth lens retaining member 6 and the fifth lens retaining member 7 are arranged adjacent to each other in the fixing cylinder 9, as shown in FIG. 13, the second guide pins 11b of the fourth lens retaining member 6 and the fourth guide pins lid of the fifth lens retaining member 7 may be engaged with the first cam portions 28a and the second cam portions 28b of the second cam slit 28 of the cam cylinder 10, respectively, such that transmission of vibration between the fourth lens retaining member 6 and the fifth lens retaining member 7 while moving, for example, to detect each other's locations, may be decreased. Also, in order to cause the second guide pine 11b to the first cam portions 28a, and the fourth guide pins 11d to the second cam portions 28b, three of the spring members 29 would be located between the lens retaining member 6 and 7 in the vicinity of the guide pin 11b and 11d. In this case, the fourth lens retaining member 6 and the fifth lens retaining member 7 are maintained in a non-contact state and allow a path of vibration transmission to be extended between the second guide pins 11b and the fourth guide pins 11d. Also, since a direction in which the vibration is transmitted is changed between the second guide pins 11b and the fourth guide pins 11d, transmission of vibration may be decreased.

To this end, vibration transmission between the fourth lens retaining member 6 and the fifth lens retaining member 7 may be decreased, and an increased degree of precision of location detection may be achieved between the focus actuator unit 15 and the anti-vibration actuator unit 18.

It should be understood that the present general inventive concept is not limited to the above-described exemplary embodiments and various changes in form and details may be made without departing from the spirit and scope of the present general inventive concept.

For example, while the present general inventive concept is described with respect to an interchangeable lens used in an SLR camera, the present general inventive concept may be widely applied to an optical appliance, such as photographing apparatus, including a lens shutter camera, a digital still camera, and a video camera, or an image projecting apparatus, including a projector, and a lens barrel employed in the optical appliance.

Although various exemplary embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A lens barrel comprising:
    a first retaining member to retain a focus actuator unit;
    a second retaining member to retain an anti-vibration actuator unit;
    a fixing cylinder in which the first retaining member and the second retaining member are disposed adjacent to each other in an optical axis direction at a fixed distance from each other along the optical axis and unable to rotate relative to each other; and
    a cam cylinder disposed about an outer circumference of the fixing cylinder, the cam cylinder being rotatable about the fixing cylinder in a circumferential direction, and the first and the second retaining members are movable along a same trajectory in the fixing cylinder according to a rotation of the cam cylinder while remaining adjacent to one another in the optical axis direction and remaining at the fixed distance from each other along the optical axis,
    wherein the lens barrel is configured to inhibit transmission of vibrations between the focus actuator unit and the anti-vibration actuator unit while detecting each other's locations.

2. An optical appliance comprising the lens barrel of claim 1.

3. A lens barrel comprising:
    a retaining unit including a first retaining member to retain a focus actuator unit and a second retaining member to retain an anti-vibration actuator unit, the first retaining member and the second retaining member being adjacent in an optical axis direction at a fixed distance from each other along the optical axis, unable to rotate relative to each other, and integrated with each other;
    a fixing cylinder in which the retaining unit is disposed and comprises a guide slit engaged with a guide pin protruding from an outer circumference of one of the first retaining member and the second retaining member, the guide pin being moveable in the guide slit, and the first retaining member and the second retaining member of the retaining unit being movable as a unit along a same trajectory in the fixing cylinder while remaining adjacent to one another in the optical axis direction and remaining at the fixed distance from each other long the optical axis; and
    a cam cylinder disposed about an outer circumference of the fixing cylinder, the cam cylinder being rotatable about the fixing cylinder in a circumferential direction, the cam cylinder comprising a cam slit engaged with the guide pin protruding from the guide slit, the guide pin being moveable in the cam slit,
    wherein the first retaining member and the second retaining member of the retaining unit are moveable in the fixing cylinder by the guide pin engaged with the guide slit and the cam slit according to a rotation of the cam cylinder, and
    wherein the lens barrel is configured to inhibit transmission of vibrations between the focus actuator unit and the anti-vibration actuator unit while detecting each other's locations.

4. The lens barrel of claim 3, wherein the retaining unit comprises an elastic vibration absorbing member disposed between the first retaining member and the second retaining member.

5. The lens barrel of claim 4, wherein the first retaining member and the second retaining member are integrated by a screw disposed in a screw hole formed in one of the first retaining member and the second retaining member, the screw being disposed through a penetrating hole formed in the other one of the first retaining member and the second retaining member,
    wherein the elastic vibration absorbing member comprises a penetrating hole through which the screw extends.

6. The lens barrel of claim 3, wherein the cam slit extends in a circumferential direction of the cam cylinder while bent toward an object side of the lens barrel.

7. An optical appliance comprising the lens barrel of claim 3.

8. A lens barrel comprising:
    a first retaining member to retain a focus actuator unit;
    a second retaining member to retain a anti-vibration actuator unit;

a fixing cylinder in which the first retaining member and the second retaining member are disposed adjacent to each other in an optical axis direction at a fixed distance from each other along the optical axis and unable to rotate relative to each other, and the fixing cylinder comprising guide slits engaged with a first guide pin and a second guide pin protruding from outer circumferences of the first retaining member and the second retaining member, the first guide pin and the second guide pin being moveable in the guide slits, the first retaining member and the second retaining member being moveable along a same trajectory in the fixing cylinder while remaining adjacent to one another in the optical axis direction and remaining at the fixed distance from each other along the optical axis; and a cam cylinder disposed about an outer circumference of the fixing cylinder, the cam cylinder being rotatable about the fixing cylinder in a circumferential direction, the cam cylinder comprising a first cam slit engaged with the first guide pin protruding from the guide slit and a second cam slit engaged with the second guide pin protruding from the guide slit, the first guide pin being moveable in the first cam slit, the second guide pin being moveable in the second cam slit, and the first and the second cam slits having a same trajectory, wherein the first retaining member and the second retaining member are moveable in the fixing cylinder by the first guide pin and the second guide pin according to a rotation of the cam cylinder, wherein the lens barrel is configured to inhibit transmission of vibrations between the focus actuator unit and the anti-vibration actuator unit while detecting each other's locations.

9. The lens barrel of claim 8, wherein the first cam slit and the second cam slit each extend in a circumferential direction of the cam cylinder while bent toward an object side of the lens barrel.

10. The lens barrel of claim 9, wherein the first cam slit and the second cam slit each have a same shape.

11. An optical appliance comprising the lens barrel of claim 8.

12. A lens barrel comprising:
a first retaining member to retain a focus actuator unit;
a second retaining member to retain an anti-vibration actuator unit;
a fixing cylinder in which the first retaining member and the second retaining member are disposed adjacent to each other in an optical axis direction at a fixed distance from each other along the optical axis and unable to rotate relative to each other, and the fixing cylinder comprising guide slits engaged with a first guide pin and a second guide pin protruding from outer circumferences of the first retaining member and the second retaining member, the first guide pin and the second guide pin being moveable in the guide slits, the first retaining member and the second retaining member being moveable along a same trajectory in the fixing cylinder while remaining adjacent to one another in the optical axis direction and remaining at the fixed distance from each other along the optical axis; and a cam cylinder disposed about an outer circumference of the fixing cylinder, the cam cylinder being rotatable about the fixing cylinder in a circumferential direction, the cam cylinder comprising a cam slit engaged with the first guide pin and the second guide pin protruding from the guide slits, the first guide pin in contact with an edge of one side of the cam slit, the second guide pin in contact with an edge of the other side of the cam slit, and the first guide pin and the second guide pin being moveable in the cam slit, wherein the first retaining member and the second retaining member are moveable in the fixing cylinder by the first and the second guide pins according to a rotation of the cam slit, and wherein the lens barrel is configured to inhibit transmission of vibrations between the focus actuator unit and the anti-vibration actuator unit while detecting each other's locations.

13. The lens barrel of claim 12, further comprising a spring member disposed between the first retaining member and the second retaining member to bias the first retaining member and the second retaining member away from each other in the optical axis direction.

14. The lens barrel of claim 12, wherein the cam slit extends in a circumferential direction of the cam cylinder while bent toward an object side of the lens barrel.

15. An optical appliance comprising the lens barrel of claim 12.

* * * * *

UNITED STATES PATENT AND TRADEMARK OFFICE
CERTIFICATE OF CORRECTION

| | |
|---|---|
| PATENT NO. | : 9,097,912 B2 |
| APPLICATION NO. | : 13/332767 |
| DATED | : August 4, 2015 |
| INVENTOR(S) | : Mitsuru Shinohara |

Page 1 of 1

It is certified that error appears in the above-identified patent and that said Letters Patent is hereby corrected as shown below:

In the claims,

Claim 3, Column 16, Line 29

Delete "long" and insert --along--, therefor.

Signed and Sealed this
Twenty-fourth Day of November, 2015

Michelle K. Lee
*Director of the United States Patent and Trademark Office*